O. JENSEN.
PROCESS FOR THE CONCENTRATION OF NITRIC ACID.
APPLICATION FILED FEB. 24, 1920.
1,395,577. Patented Nov. 1, 1921.
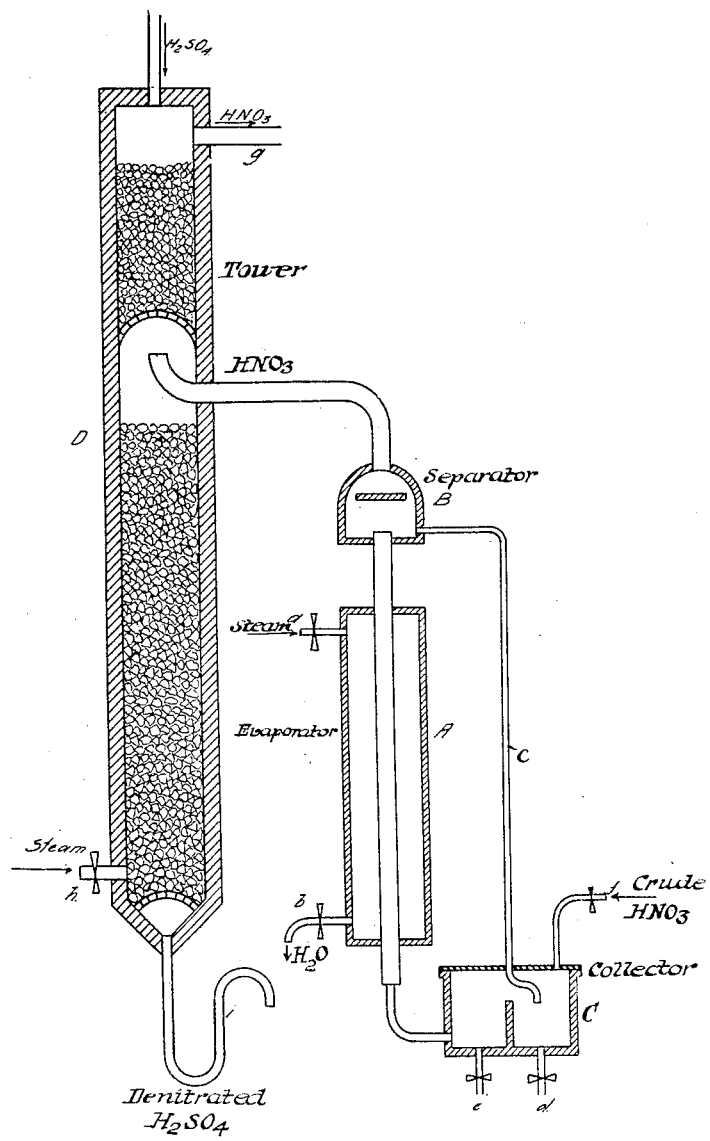

UNITED STATES PATENT OFFICE.

OLAF JENSEN, OF NOTODDEN, NORWAY, ASSIGNOR TO NORSK HYDRO-ELEKTRISK KVAELSTOFAKTIESELSKAB, OF CHRISTIANIA, NORWAY.

PROCESS FOR THE CONCENTRATION OF NITRIC ACID.

1,395,577.    Specification of Letters Patent.    Patented Nov. 1, 1921.

Application filed February 24, 1920. Serial No. 360,818.

*To all whom it may concern:*

Be it known that I, OLAF JENSEN, a subject of the King of Norway, residing at Notodden, Norway, have invented certain new and useful Improvements in Processes for the Concentration of Nitric Acid; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to the concentration of nitric acid by passing vapors of dilute nitric acid in contact with concentrated sulfuric acid and has for its object an improved method of carrying such concentration into effect, whereby certain drawbacks connected with the process as hitherto practised are avoided.

When nitric acid is concentrated in accordance with the recent methods by converting the acid into vapor and desiccating the vapor by means of sulfuric acid difficulties involved by the formation of scale are met with. The nitric acid never is of such a high degree of purity as to be quite free from non-volatile constituents. Experience shows that such solid constituents of the acid are precipitated upon the walls forming scale, which even when present in a very thin layer will effect a considerable disturbance of the transmission of heat. According to the observations which I have made it is possible, however, to eliminate this drawback by a change in the conditions of working. The concentration has hitherto been practised by introducing the dilute nitric acid into an evaporator, in which the volatile constituents have been converted into vapor, while the solid constituents are retained, and when the concentration as to solid constituents has increased to the point of saturation, the solids will be precipitated at the points where the evaporation takes place, that is at the heating surface.

According to the present invention the process is carried into effect under such conditions that the precipitated substances are prevented from forming scale by adhering to the surfaces of the apparatus.

This result is attained by only partially evaporating the acid, maintaining the acid in motion during the evaporation and causing the separation of precipitated solid substances outside of the evaporator.

In carrying the process into effect a quantity of acid in excess of that which is to be evaporated is passed through the evaporator. This excess quantity of acid is suitably introduced into the evaporator again after having been freed from sludge in a clarifier.

The clarifier as well as the conduits to and from the same may be insulated whereby the losses of heat can be made quite insignificant. When the percentage of solid impurities is quite small, it is not necessary to provide a constant clarifying of the entire quantity of acid in circulation. One may for instance proceed by passing only a minor part of the circulation liquid through the clarifier.

In the following a method of carrying the invention into effect is described with reference to the accompanying drawing, which is a sectional view of a concentration plant.

In the illustrated example A designates a boiling or evaporation column provided with steam jacket, into which steam is supplied at $a$, water of condensation being discharged at $b$. From the inner tube of the column the vapor enters the separator B, where the particles of liquid are separated out. The liquid then passes through the pipe $c$ to the sludge collector C and therefrom back to the inner tube in the column A. From the sludge collector the sludge is discharged periodically through the valves $d$ and $e$, fresh quantities of acid being supplied through the pipe $f$.

The nitric acid vapor from the separator B enters the tower D, where it meets a flow of concentrated sulfuric acid which trickles down through a layer of pieces of quartz or other filling material. The vapor after having passed the layer of quartz charged with sulfuric acid escapes in a dry condition through the pipe $g$ and may then be condensed by known means. The sulfuric acid after having acted to desiccate the nitric acid vapor, will have taken up some nitric acid. This nitric acid is expelled in the lower part of the tower by means of steam entering the tower through the valve $h$ and the sulfuric acid freed from nitric acid (denitrated) is withdrawn through the siphon pipe $i$.

Claims:—

1. The process of concentrating nitric acid, which comprises circulating the crude nitric acid through an evaporator, withdrawing nitric acid vapor from the circulating current of acid, and drying said vapor.

2. The process of concentrating nitric acid, which comprises circulating the crude nitric acid through an evaporator and a sludge chamber, whereby the solids are separated outside the evaporator in said sludge chamber, and withdrawing and drying the nitric acid vapors.

3. The process of concentrating nitric acid, which comprises circulating the crude nitric acid through an evaporator, a liquid separator and a sludge chamber, whereby the solids are separated outside the evaporator in said sludge chamber, and withdrawing nitric acid vapors from the separator, and drying the nitric acid vapors.

In testimony that I claim the foregoing as my invention, I have signed my name in presence of two subscribing witnesses.

OLAF JENSEN.

Witnesses:
E. S. HENDRICKSEN,
ROBERT H. FREIZIER.